Sept. 3, 1946.   G. S. BURROUGHS   2,406,798
DIRECTION FINDER
Filed Jan. 26, 1944   4 Sheets-Sheet 1

INVENTOR.
GORDON S. BURROUGHS
BY
ATTORNEY

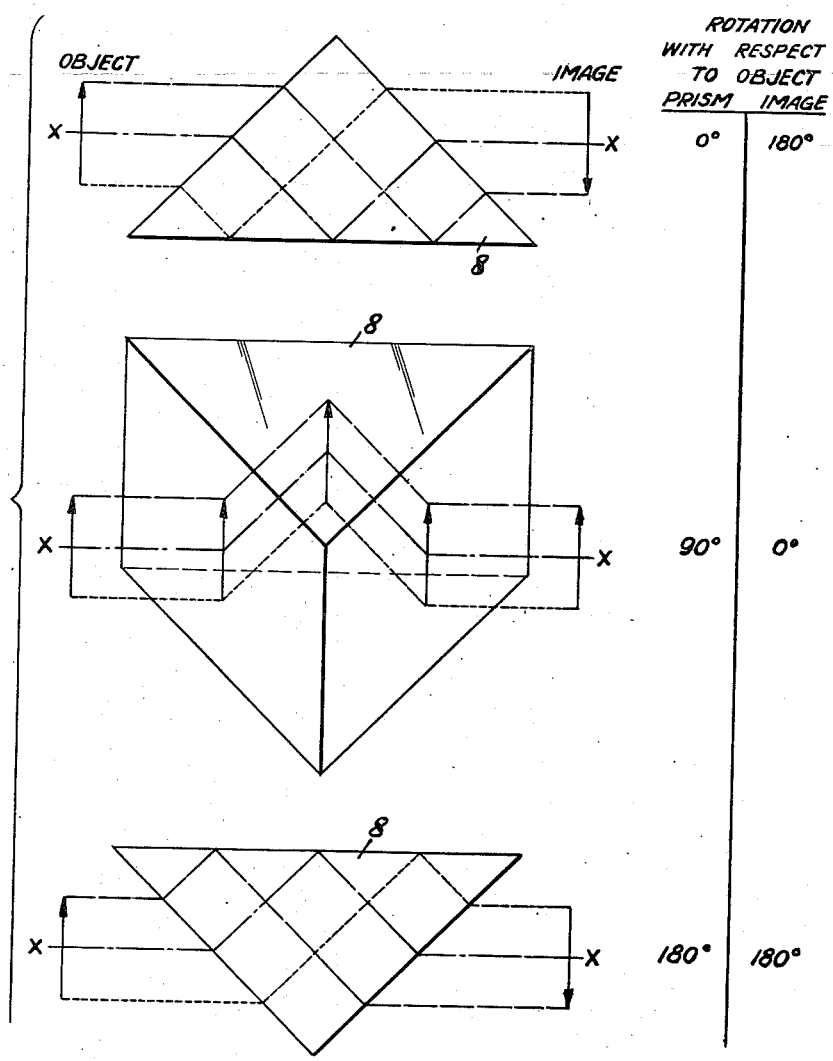

Sept. 3, 1946.　　　　G. S. BURROUGHS　　　　2,406,798
DIRECTION FINDER
Filed Jan. 26, 1944　　　　4 Sheets-Sheet 3
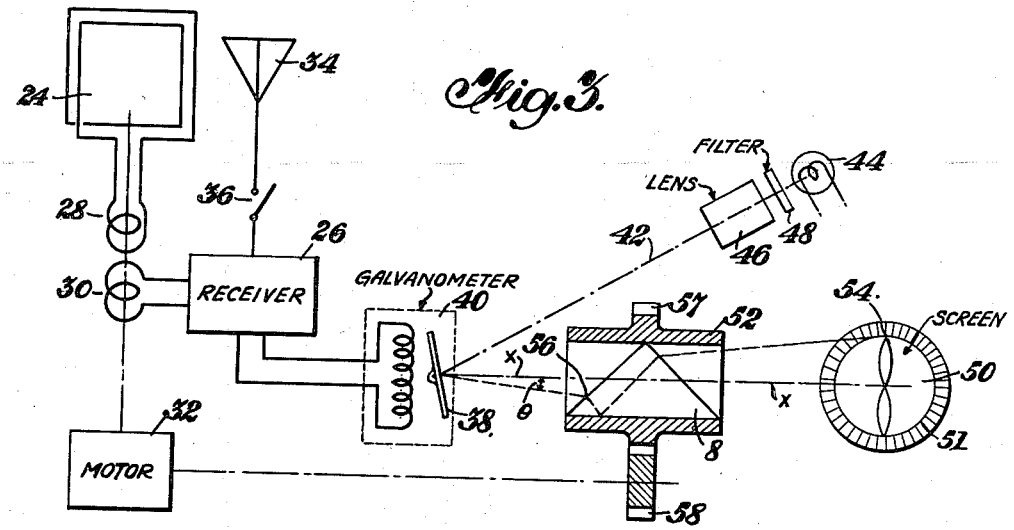
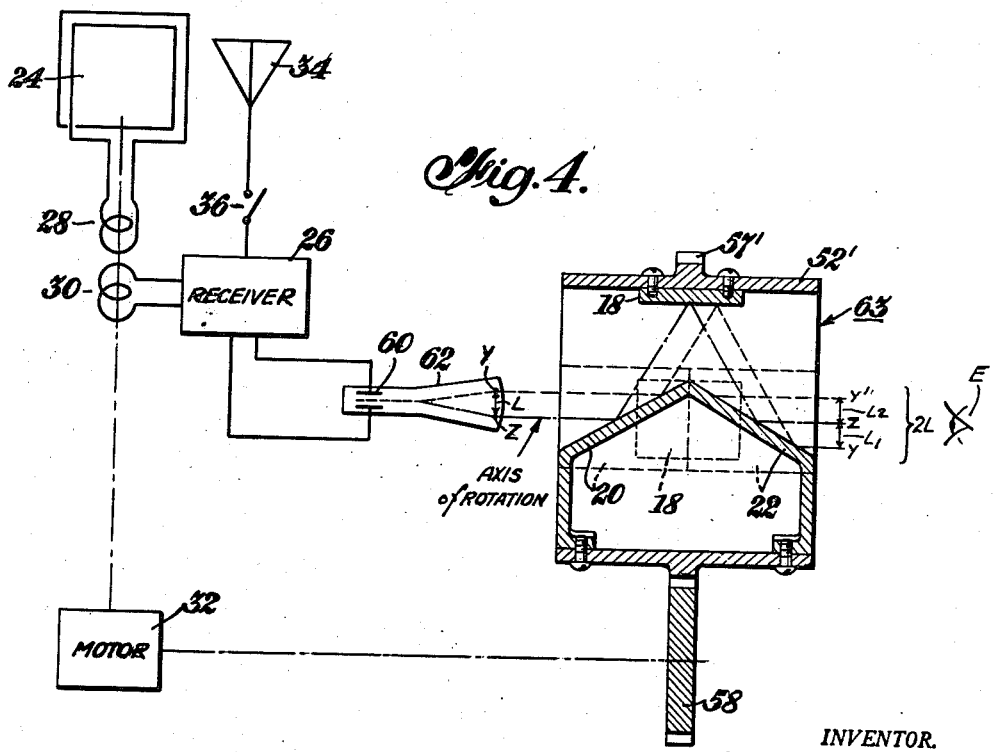
INVENTOR.
GORDON S. BURROUGHS
BY
ATTORNEY Sept. 3, 1946.       G. S. BURROUGHS       2,406,798
DIRECTION FINDER
Filed Jan. 26, 1944       4 Sheets-Sheet 4
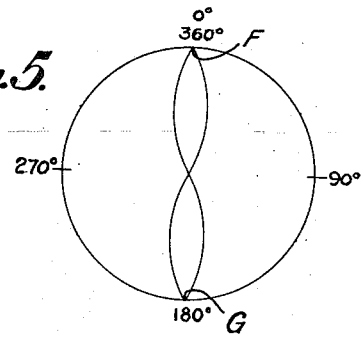
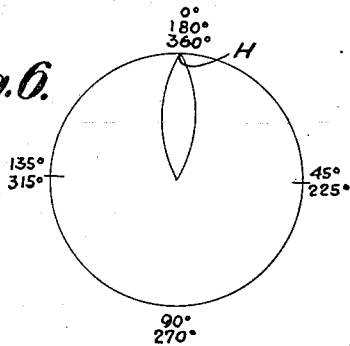
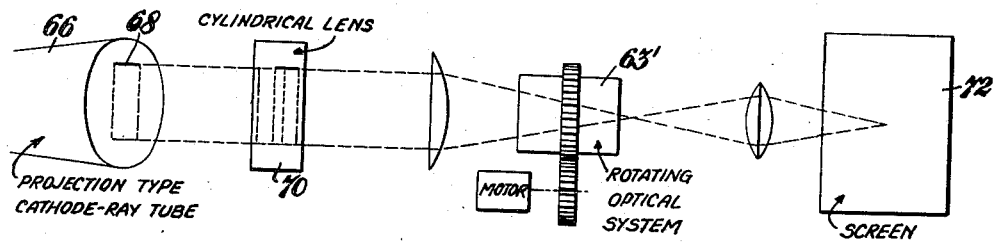
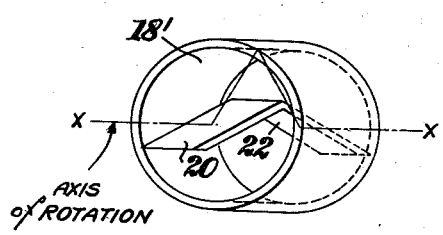
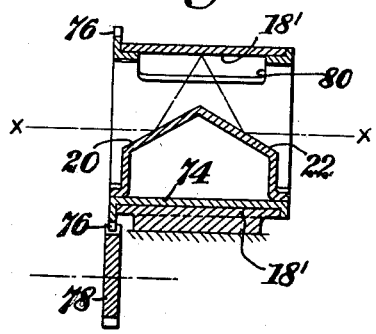
INVENTOR.
GORDON S. BURROUGHS
BY
*R P Morris*
ATTORNEY Patented Sept. 3, 1946

2,406,798

UNITED STATES PATENT OFFICE 2,406,798

DIRECTION FINDER

Gordon S. Burroughs, Forest Hills, N. Y., assignor to Federal Telephone and Radio Corporation, New York, N. Y., a corporation of Delaware Application January 26, 1944, Serial No. 519,779

16 Claims. (Cl. 250—11)

The present invention relates to improvements in direction finders, and also to an improved form of optical rotation system suitable for use therewith.

It is often desirable, when an observer is viewing an object, that the image seen by the observer be inverted or otherwise turned at an angle. While of course, this may be accomplished through an actual change in position of the object itself, this is often inconvenient or impractical. Accordingly an optical system must be provided by means of which the angular position of the image may be changed although the object remains stationary.

It has been found that a prism or mirror assembly with a number of light deviating surfaces, which include an odd number of reflecting surfaces, will, when rotated about a certain axis, rotate an image that is projected or viewed through it. For example, a prism having one reflecting surface and two refracting surfaces, or a mirror assembly having three reflecting surfaces will satisfy these requirements. It has also been found that the rotation of such an image will be at twice the speed at which the optical assembly is rotated.

An optical assembly of the above nature has been utilized in designing an improved direction finder of the type in which there is traced upon a screen a polar diagram having its null points indicating the direction from which a signal is received. Normally such a polar diagram is produced in one of two ways, either by means of a cathode-ray tube having deflection coils, or else by means of a mirror galvanometer in conjunction with a fixed or rotating screen. The present invention was designed with a view toward simplifying these devices and overcoming a number of defects inherent therein.

Direction finding apparatus employing a cathode-ray tube will first be considered. In such apparatus the ray is customarily biased so that in the absence of an incoming signal a circular trace is obtained on the screen of the tube. However, considerable difficulty has been experienced in making this trace smooth and exactly circular at all points. A slight variation in the deflection voltages results in a wavy outline, and furthermore the complex construction of, and balance required for, the rotating deflection coil assembly renders its adjustment and maintenance a problem. The present invention, in one modification, eliminates such a rotary assembly, and permits the use of a single pair of electrostatic deflection plates. The problem of adjustment and maintenance is thereby overcome, inasmuch as these electrostatic plates are naturally of a stationary nature. Furthermore, since the present invention relies upon mechanical rotation of an optical system to obtain the desired polar diagram, the degree of accuracy of the pattern is considerably higher than that of diagrams in which dependence is placed on exactly correlated deflection voltages supplied to rotating coils.

Another problem presented by the use of cathode-ray tubes in direction finders is the limited diameter of the screens. Where small screens are employed, accuracy of the bearing is sacrificed due to the reduced scale. Tubes with large screens are of course high in cost. By means of the present invention, the pattern appearing on the screen of a cathode-ray tube is effectively doubled in size without the necessity of overall enlargement by conventional magnifying apparatus.

Direction finding apparatus employing a vibrating mirror and a fixed or rotating screen will now be considered. This type of apparatus has in part been superseded by the cathode-ray method above described, but still has numerous present and potential applications. In this type of direction finder, the loop antenna or goniometer is customarily either mechanically coupled to a mirror galvanometer, or else the loop or goniometer is mechanically coupled to a rotating screen while the mirror of a galvanometer vibrates but does not rotate.

In the former case the results obtained are highly unsatisfactory. This is due in large measure to the fact that a mirror galvanometer is a very delicately balanced and adjusted instrument, and when it is subjected to rotation upon being coupled to the mechanism driving the antenna or goniometer, it loses a large percentage of its accuracy due to the rotational forces acting thereupon. In the form of the present invention utilizing a vibrating mirror, there is no rotation thereof, and consequently no diminution of accuracy.

In cases where a rotating screen is employed in conjunction with a non-rotating mirror, the disadvantages are obvious. A screen large enough to frame the polar diagram is cumbersome to rotate, is subject to wobbling, and for practical purposes cannot be viewed directly but instead must be scrutinized through a reflecting device. In the embodiment of the present invention relevant thereto the screen is stationary.

With the above points in mind, the present invention has as one of its objects the provision of a rotating optical system in which the image of an object viewed therethrough is rotated at twice the speed of rotation of the optical system.

Another object of the invention is the provision of a direction finding system of the cathode-ray type in which a polar diagram is obtained without the use of electromagnetic deflection coils.

A further object of the invention is the provision of a direction finding system of the vibrating mirror type in which neither the mirror nor the screen rotate during operation of the system.

A still further object of the invention is the provision of a direction finding system of the cathode-ray type, in which a polar diagram having a diameter twice the length of the linear trace appearing on the screen of the tube is obtained without the use of conventional magnifying apparatus.

An additional object of the invention is to provide means for condensing the light from a cathode-ray tube so as to obtain a brighter and more distinct trace on a screen.

Other objects and advantages will be apparent from the following description of preferred forms of the invention and from the drawings, in which:

Fig. 2 illustrates one of the optical arrangements of Fig. 1 when turned through angles of 90° and 180°, showing the image correspondingly turned through angles of 180° and 360°;

Fig. 3 illustrates schematically an improved form of mirror galvanometer direction finding system utilizing one of the optical arrangements of Fig. 1;

Fig. 4 illustrates schematically an improved form of cathode-ray direction finding system utilizing one of the optical arrangements of Fig. 1;

Fig. 5 illustrates a polar diagram of the usual double arrow type that may be obtained in the direction finding systems of Figs. 3 and 4 when the optical arrangement is rotated at half the speed of the loop antenna;

Fig. 6 illustrates a polar diagram such as may be obtained in the direction finding system of Fig. 4 when the optical arrangement is rotated at the same speed as the antenna;

Fig. 7 is a modification of Fig. 4 in which a projection type cathode-ray tube is used to obtain a trace on a screen;

Fig. 8 illustrates schematically a modified optical arrangement in which one of the reflecting surfaces remains stationary while the others are rotatable; and Fig. 9 is a partly sectional view of Fig. 8, also showing a preferred means for rotating certain of the reflecting surfaces.

Figure 1:
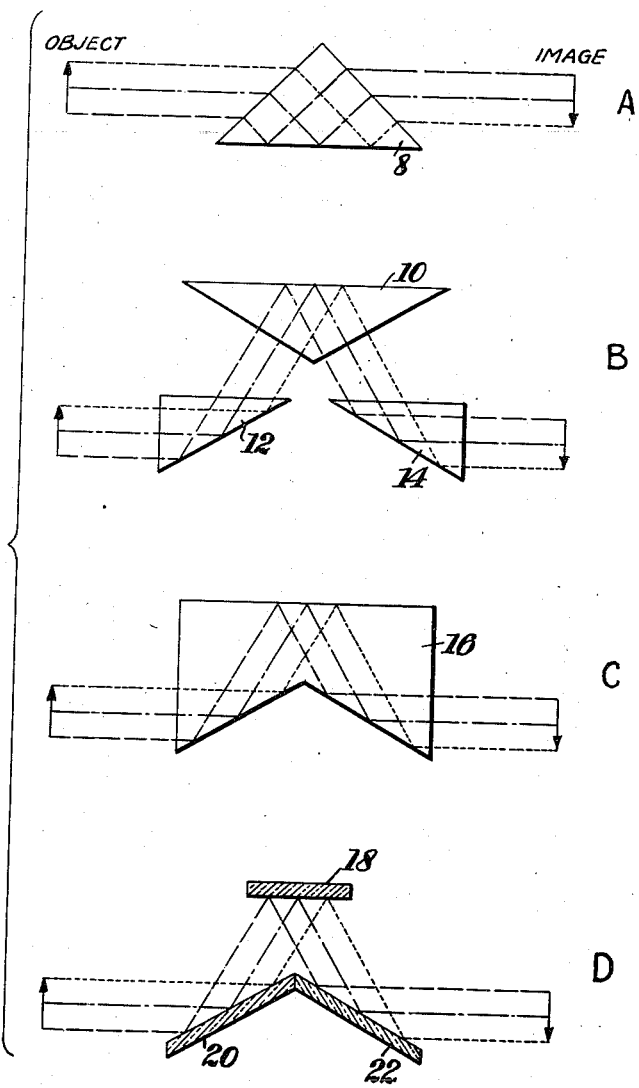
Fig. 1 illustrates schematically several optical arrangements, showing the paths of light from an object through a number of cooperating, light-deviating surfaces including an odd number of reflecting surfaces, when the reflections are in the plane of the object.

Fig. 1 shows several types of known optical arrangements utilized in the present invention. Type "A" comprises a single prism 8 having two refracting surfaces and a single reflecting surface. Type "B" comprises three prisms 10, 12, 14 arranged as shown and having three reflecting surfaces. Type "C" comprises a single prism 16 having three reflecting surfaces. Type "D" is composed of three mirrors 18, 20, 22 having three reflecting surfaces similar in arrangement to the reflecting surfaces of the prisms 10, 12, 14 of type "B." From the relative position of the object and image in all of these arrangements it will be seen that the image is inverted or rotated 180° with respect to the object. It might be mentioned that although only arrangements having one or three reflecting surfaces have been shown, nevertheless the principle is the same for any odd number of reflecting surfaces greater than three. It should also be noted that in all of the arrangements the paths of the reflected light lie in the same plane as the object.

Fig. 2 illustrates the result of rotating one of the optical arrangements of Fig. 1 about a certain axis through an angle of 180°. As an example type "A" has been selected, although any of the other types would produce similar results.

With the prism 8 upright, the light paths are the same as in Fig. 1—that is, the image is inverted. As the prism is rotated 90° about axis X—X so that the apex points upward from the paper, the light paths will be as shown, and the image will be upright or turned 180° from its initial position. The 90° rotated prism has been shown in exaggerated perspective to bring out more clearly the light paths. Another 90° rotation of the prism about axis X—X will once again invert the image. Thus while the prism has rotated from 0° to 180° (or through a total angle of 180°) the image has rotated from 180° to 180° (or through a total angle of 360°).

It will be noted that only one light ray from object to image in Fig. 2 has its incident and emerging components linear with respect to one another, and which components remain co-linear for all rotary positions of the prism. This single light ray is the one following the path X—X. When the prism is rotated about X—X as an axis, the light ray following this path will be unaffected insofar as its incident and emerging components are concerned. The above is true also for any other of the optical arrangements of Fig. 1, and forms one of the characteristics of any optical arrangement used in or with the present invention. The axis X—X along which the incident and emerging components of a light ray remain co-linear during rotation of the optical system is herein termed the "neutral axis" of the system, and as employed in connection with the present invention this term may be assumed to have the meaning above given.

Fig. 3 illustrates an improved type of direction finder employing a mirror galvanometer and one of the optical arrangements of Fig. 1. A rotating exploring system such as a loop antenna 24 is connected to a receiver 26 across a symmetrical inductive coupling consisting of a coil 28 which rotates simultaneously with the loop 24, and a fixed coil 30. A motor or other source of power 32 is provided for rotating the antenna 24. It will be clear that if desired other exploring systems such as the rotating coil of a goniometer may be used in place of the rotating antenna 24. A vertical or sense antenna 34 may be connected to receiver 26 in the customary manner by closing of a switch 36.

The output of receiver 26 is used to control the position of a mirror 38 forming part of a mirror galvanometer 40. A beam of light as indicated at 42 emanating from a source such as lamp 44 passes through lens 46 and falls upon mirror 38. A filter 48 may be used between lamp 44 and lens 46 so as to pass only light of a substantially single color, such as for example green.

After being reflected from mirror 38, the light beam 42 passes through an optical arrangement consisting of the prism 8 of Figs. 1 and 2, and then falls upon a screen 50 of some suitable material such as frosted glass.

Prism 8 is securely positioned within a hollow tube 52, the tube 52 being mounted for rotation about the neutral axis of the prism. This neutral axis of prism 8 is indicated by the dotted line X—X which extends from mirror 38 to the center of screen 50. The means for rotating hollow tube 52 about axis X—X may be of any suitable nature. In the drawings this means has been shown as a ring gear 57 encircling tube 52 and engaged by a pinion gear 58. Gear 58 is driven by motor 32, so that the rotation of antenna 24 is synchronized with the rotation of prism 8.

Mirror 38 is given an initial inclination so that when no signal is received by antenna 24, the beam 42 will form an angle $\theta$ with the neutral axis X—X of prism 8, striking the prism at point 56. Due to the optical characteristics of prism 8, as brought out above and as shown in Fig. 2, the beam 42 will fall upon screen 50 at a point 54 which is inverted or rotated 180° about axis X—X with respect to point 56.

Considering now the rotation of prism 8, it will be seen that with no change in the angle $\theta$, point 54 will describe a circle on screen 50. This "zero circle" assumes that no current flows in galvanometer 40. The rate at which point 54 moves will be twice the rate at which tube 52 is rotated, due again to the optical characteristics of the prism as shown in Fig. 2. A circular scale 51 is provided on screen 50, which in a conventional manner is concentric with the zero circle formed by point 54.

If current flows in galvanometer 40 due to the reception of a signal by receiver 26, angle $\theta$ changes, and the luminous spot 54 moves towards the center of screen 50. If tube 52 is driven by gear 58 at half the speed of rotation of antenna 24, then upon rotation of antenna 24 in the alternating magnetic field of any transmitter, the luminous spot 54 will be situated in the two minimum response positions of the antenna on the zero circle, whereas in the other positions the luminous spot has moved in a radial direction in proportion to the potential induced in the antenna. Thus when the spot 54 is deviated toward the center, the screen reveals a diagram as shown in Figs. 3 and 5, being the normal double arrow pattern in which points F and G in Fig. 5 indicate the nulls which characterize the direction of the transmitter. If desired, the screen 50 may have a phosphorescent coating so as to give persistence to a slowly rotating spot. The sense indication is introduced into the circuit in the customary manner by closing switch 36 to connect antenna 34 to receiver 26. Preferably the connections to the goniometer coils are made to advance the sense pattern 90°.

The above description has assumed a rotation of tube 52 at half the speed of rotation of antenna 24. However, when the speed of rotation of both these elements is the same, then a diagram such as shown in Fig 6 is obtained. This is because spot 54 of Fig. 3 is now moving at twice the speed of rotation of tube 52, or in other words its speed is doubled with respect to the frequency at which the signal is received by receiver 26. The two points F and G in Fig. 5 will now be superimposed one upon the other as shown at H in Fig. 6, point G covering an arc of 360° instead of 180°, and point F covering a second arc of 360°.

The above mode of operation produces in effect a double length scale which has the advantage of more accurate readings. However, as shown in Fig. 6, it introduces an ambiguity of scale, rather than the usual ambiguity of arrows or loops as is the case in Fig. 5. It is therefore suitable primarily for use where the quadrant of the received signal is known from the geographical or other characteristics of the receiver, such for example as the direction of a ship from the shoreline of a body of water. Also in triangulation, the point of intersection of the axes can lie in but one direction from each receiver.

Fig. 4 illustrates an improved type of direction finder employing a cathode-ray tube and one of the optical arrangements of Fig. 1, in this case the three mirrors 18, 20, 22 of arrangement "D."

The direction finder system of Fig. 4 is similar in many respects to that of Fig. 3. However, the output from receiver 26, instead of being connected to galvanometer 40, is fed to the vertical electrostatic deflection plates 60 of a cathode-ray tube 62.

Tube 62 is biased so that when no signal is received by antenna 24 the ray will form a luminous spot at point Y on the screen of the tube. Application of a signal voltage to plates 60 will cause the spot to move vertically toward point Z. The distance between Y and Z, and therefore the maximum distance through which the ray can be deflected, is indicated as L. Distance L may correspond closely to the diameter of the screen of the cathode-ray tube. Thus a linear trace YZ is produced by the ray of tube 62, the length of the trace being dependent on the strength of the incoming signal.

The three mirrors 18, 20, 22 of the arrangement of Fig. 1 "D" are mounted in fixed spaced relation by brackets or other suitable means within a hollow tube 52', this tube performing a function similar to the hollow tube 52 of Fig. 3. A ring gear 57' encircling tube 52 engages gear 58 which as in Fig. 3 is driven by the same motor 32 that rotates antenna 24.

This rotating optical arrangement indicated generally as 63 is mounted for rotation about the neutral axis of the mirror assembly, the neutral axis coinciding with the longitudinal axis of rotation of tube 52'. The rotating optical arrangement 63 is positioned adjacent the screen of cathode-ray tube 62, and is so disposed that the combined neutral and rotating axis of the arrangement lies in a horizontal plane and intersects the screen of the cathode-ray tube at point Z.

Since a beam of light projected along, or a luminous object viewed along, the neutral axis of an optical arrangement is not laterally displaced, light from point Z on the screen of tube 62 will be in the same apparent position when viewed from a point such as E on the opposite side of the optical arrangement 63 from that on which tube 62 is located. This is without regard to the instantaneous rotary position of the tube 52' inasmuch as the position of the neutral axis of the mirror arrangement is constant with respect to such rotation.

However, light from any other point along the path L between Y and Z will be displaced from its position with respect to an observer at E upon rotation of tube 52'. The amount of this displacement will depend upon the distance of such point from Z, and also on the instantaneous rotary position of tube 52'. When the optical arrangement 63 is as shown in Fig. 4 (with the mirrors 18, 20, 22 in the positions indicated by the solid lines) the line L on the screen of tube 62 will appear as a line $L_1$ to an observer at E, this line L₁ being inverted. The light path Y—Y is shown by the dotted lines. The amount of vertical displacement of the path Y—Y will depend on the angle between mirrors 20, 22, and also on the distance of mirror 18 from the apex of mirrors 20, 22. In the present instance these factors have been chosen so that Y—Y will be displaced sufficiently to make $L=L_1$. Path Z—Z, however, can not be vertically displaced, and therefore the light reflected from mirror 20 must strike mirror 18 at a point directly above the apex of mirrors 20, 22.

If the optical arrangement 63 is rotated 90° in a clockwise direction (as viewed from E), the mirror 18 will appear in a plane parallel to that of the paper as shown by the broken lines, with the mirrors 20, 22 projecting downwardly into the paper to intersect at the broken line shown. Line L will now appear to an observer at E as in upright line L₂, lying in the same horizontal plane as line L. Reference to Fig. 2 will provide additional illustration of this phenomena.

The points Y and Y' on the viewing side of arrangement 63 are 180° apart. Since $L=L_1=L_2$, then $L_1+L_2=2L$, and upon rotation of tube 52' light from point Y on the screen of tube 62 will describe a circular path, the diameter of the path being twice the distance L.

Since the beam of cathode-ray tube 62 is biased to point Y when no signal is being received by antenna 24, the usual zero circle will be viewed by an observer at E. Displacement of the spot from Y toward Z upon reception of a signal will produce a polar diagram, the pattern thereof depending on the speed of rotation of tube 52'. If this speed is half the speed of rotation of antenna 24, the usual double arrow diagram of Fig. 5 will appear. Similar speeds of antenna 24 and tube 52' will give the double scale pattern of Fig. 6. The speed of rotation of tube 52' depends in part on the gear ratio between gears 57' and 58, or can be otherwise varied in any desired manner.

In Fig. 4 the luminous trace on the screen of tube 62 is not actually projected through the optical arrangement 63, but is merely viewed or reflected through such arrangement.

If it is desired to increase the size of the pattern, the system of Fig. 7 may be employed. In the latter figure a cathode-ray tube 66 of the projection type is utilized. This tube has a beam that forms a horizontal line 68 of short length. If desired, this can be accomplished by horizontally deflecting the beam from side-to-side at high frequency. This luminous line 68 is then projected through a cylindrical lens 70 which condenses the light in a horizontal plane, but has no effect on the light insofar as the vertical components thereof are concerned. The output of lens 70 is therefore a single spot instead of a line. The light then passes through a rotating optical system 63', which may be identical with arrangement 63 of Fig. 4, or may be another arrangement, such as one of the types shown in Fig. 1. A polar diagram preferably as shown in Fig. 5 or 6 can then be caused to appear on a screen 72 upon vertical deflection of line 68 in the same manner as the beam of tube 62 of Fig. 4 is deflected, that is, by application of a signal voltage to the deflection plates of the tube. As a result of condensing the light from line 68 into a single spot through the use of lens 70, a very bright and easily readable diagram will be produced on screen 72.

In Figs. 8 and 9 is shown a modified form of optical arrangement in which a hollow cylinder 18' having an inner reflecting surface is utilized in place of the plane mirror 18 of Fig. 1 "D." Also, whereas in Fig. 1 "D" the mirror 18 rotates as a unit together with the mirrors 20 and 22, in Figs. 8 and 9 the hollow cylinder 18' is stationary. Since the cylinder 18' is positioned to be co-axial with the neutral axis X—X of the optical arrangement (the axis X—X being in addition the axis of rotation of the mirrors 20, 22), no distortion of a linear object will occur, inasmuch as the reflections from the surface of cylinder 18' will be along a line parallel with the axis X—X. This is best shown in Fig. 9.

Fig. 9 also illustrates a preferred means for rotating the mirrors 20, 22 without obstructing the light paths. This means includes a second hollow cylinder 74 having a cut-out portion 80 and supporting the mirrors 20, 22 (which are assumed to be rigidly secured together). The cylinder 74 is connected to a ring gear 76 coaxially mounted with stationary cylinder 18'. A pinion gear 78 driven by some suitable source of power (not shown) serves to rotate ring gear 76. When the latter is rotated, mirror assembly 20, 22 will be turned about axis X—X. This arrangement is advantageous when a rotation of mirror 18 of Fig. 1 "D" is undesirable or impractical.

While I have described above the principles of my invention in connection with specific direction finder apparatus, and particular modifications thereof, it is to be clearly understood that this description is made only by way of example, and not as a limitation on the scope of my invention as set forth in the objects of my invention and in the accompanying claims.

I claim:

1. In a direction finder including a rotatable direction finder exploring system, means for rotating said exploring system, a mirror galvanometer, means for causing high-frequency current generated in said exploring system by incoming electromagnetic waves to act on said galvanometer substantially linearly to deviate the same, and a source of light disposed so as to project a beam on the mirror of the galvanometer, the combination of means serving to trace a polar diagram comprising an optical system, said optical system comprising an element having a reflecting surface, means for deviating said beam toward said reflecting surface, further means for deviating the beam reflected from said surface in parallel relation with the beam reflected from said mirror, means for rotating said deviating means and said element as a unit about the neutral axis of said unit and in timed relation with said exploring system, and a screen disposed so as to receive said beam of light after the latter has passed through said optical system, the surface of said screen being intersected by the axis of rotation of said optical system.

2. A direction finder according to claim 1, in which said deviating means and said element together constitute one or more prisms.

3. A direction finder according to claim 1, in which said element constitutes a mirror, and said deviating means constitute additional mirrors.

4. A direction finder according to claim 1, in which said means for rotating said optical system is arranged to rotate said optical system at half the speed at which the said means for rotating said exploring system operates.

5. In a direct-reading radio compass having a rotatable direction finder exploring system, means for rotating said exploring system, a mirror galvanometer, and a source of light disposed so as to project a beam on the mirror of the galvanometer, the combination of an optical system rotatable about its neutral axis, said optical system being so disposed that the beam of light reflected by the mirror of said galvanometer will normally coincide with the neutral axis of said optical system, means for giving to the mirror of said galvanometer an initial inclination such that the beam of light reflected by the mirror will strike said optical system at a point not on the neutral axis thereof, a screen perpendicular to the axis of rotation of said optical system, whereby the beam of light after passing through said optical system will strike said screen, means for rotating said optical system in timed relation with said rotatable exploring system, and means for causing high-frequency current generated in the said exploring system by incoming electromagnetic waves to act on said galvanometer so as to deviate said mirror from its initial position to produce substantially linear deviation of said beam of light.

6. A radio compass according to claim 5, in which said optical system comprises one or more prisms having in the aggregate an odd number of surfaces sequentially reflecting said beam.

7. A radio compass according to claim 5, in which said optical system comprises one or more mirrors having in the aggregate an odd number of surfaces sequentially reflecting said beam.

8. A radio compass according to claim 5, in which the means for rotating said optical system rotates the latter at half the speed at which the means for rotating said exploring system operates.

9. In a direction finder including a rotatable direction finder exploring system, means for rotating said exploring system, a cathode-ray tube having a pair of electrostatic deflection plates, means for giving an initial bias to the beam of said tube so that the spot produced by said beam will normally appear near the circumference of the screen of said tube when no voltage from said exploring system is applied to said plates, and means for applying a signal voltage from said exploring system to said plates to cause said beam to be displaced linearly in accordance with the applied signal strength, the combination of an optical system adjacent the screen of said cathode-ray tube, said optical system being rotatable about its neutral axis, said axis intersecting the screen of said tube at the point to which the beam thereof is normally biased, said optical system comprising one or more elements having an odd number of reflecting plane surfaces, and means for rotating said optical system in timed relation with said means for rotating said exploring system, so that the spot on the screen of said tube will be sequentially reflected by the surfaces of said optical system.

10. A direction finder according to claim 9, in which said optical system comprises one or more prisms having in the aggregate an odd number of surfaces for sequentially reflecting said spot.

11. A direction finder according to claim 9, in which said means for rotating said optical system is arranged to rotate said optical system at half the speed at which the said means for rotating said exploring system operates.

12. In a direct-reading radio compass of the type including a rotatable direction finder exploring system, means for rotating said exploring system, a cathode-ray tube having a pair of deflection plates, a receiver connected to said exploring system, and means for applying said receiver output to said deflection plates, the combination of an optical arrangement adjacent the screen of said cathode ray tube, said optical arrangement comprising an odd number of mirrors having plane surfaces, said optical arrangement designed to reflect therethrough the linear trace on the screen of said tube produced by application of a signal voltage from said receiver to said plates, and means for rotating said optical arrangement about its neutral axis synchronously with the said exploring system rotating means, whereby the said linear trace when reflected through said optical arrangement will produce in effect a polar diagram having a diameter twice the length of the longest trace obtainable on the screen of said tube.

13. In a direction finder system of the type in which a signal received by a rotating scanning device causes a beam of energy to be linearly displaced, the amount of displacement being a function of the strength of the received signal, the combination of a rotatable optical system in the path of the displaced beam, said optical system comprising one or more elements having an odd number of reflecting plane surfaces, and means for rotating said optical system about its neutral axis and synchronously with said scanning device, whereby said linearly displaced beam will be translated by said optical system into a polar diagram indicating the direction of the received signal.

14. In a direction finder system, a rotatable scanning device, a receiver connected to said scanning device, a cathode-ray tube of the projection type having a pair of deflection plates, the beam of said tube having an oscillatory motion at right angles to the line of movement of said beam when energy from said receiver is received on said plates, means feeding the output of said receiver to said plates, a cylindrical lens in the path of said beam for condensing the oscillatory motion of said beam into a single spot without altering the normal path of said beam in response to energy received on said plates from said receiver, an optical system rotatable about its neutral axis and lying in the path of the beam passed by said lens, said optical system including an odd number of plane reflecting surfaces, a screen perpendicular to the neutral axis of said optical system, and means for simultaneously rotating said optical system and said scanning device so that said beam will produce a polar diagram on said screen in response to energy received by said scanning device.

15. In a direction finder system of the type in which a signal received by a rotating scanning device causes a beam of energy to be linearly displaced to form an incident beam, the amount of displacement being a function of the strength of the received signal, the combination of a rotatable optical system, said optical system comprising an element having a reflecting surface, means for deviating said incident beam toward said surface, further means for deviating the beam reflected from said surface so that it will emerge from said optical system in substantially parallel relation with said incident beam, and means for rotating said optical system synchronously with said scanning device and about an axis determined by the incident and emerging components of said beam when said beam strikes said first deviating means in a certain position, the said incident and emerging components of said beam when said beam is in said certain position being substantially co-linear during said rotation, whereby said linearly displaced incident beam will be translated by said optical system and said rotating means into a polar diagram indicating the direction of the received signal.

16. In a direction finder system of the type in which the angular position of a source of energy from a fixed zero axis is translated by means including a rotating scanning device into a first visible indication the position of which along a linear scale from a fixed zero point thereon is a function of the angular position of said source from said axis, means for translating said visible indication into a further visible indication having an angular position with respect to said fixed zero axis corresponding substantially to the angular position of said source, said last-mentioned means including a rotatable optical arrangement, said optical arrangement comprising an element having a reflecting surface, means for deviating said incident rays toward said surface, further means for deviating the rays reflected from said surface so that they will emerge from said arrangement in substantially parallel relation with said incident rays, and means for rotating said arrangement synchronously with said scanning device and about an axis determined by the incident and emerging components of one of said rays, the incident and emerging components of said one ray lying in substantially co-linear relation and remaining in such relation during said rotation.

GORDON S. BURROUGHS.